United States Patent

[11] 3,540,743

[72] Inventors Edwin J. Ashton;
 Bernard F. Kupfert, Peoria, Illinois
[21] Appl. No. 707,999
[22] Filed Feb. 26, 1968
[45] Patented Nov. 17, 1970
[73] Assignee Caterpillar Tractor Co.,
 Peoria, Illinois
 a corporation of California

[54] INVERTED FLOATING RING SEAL
 8 Claims, 1 Drawing Fig.
[52] U.S. Cl. .................................................. 277/92,
 305/11
[51] Int. Cl. .................................................. F16j 15/54
[50] Field of Search .......................................... 305/11;
 ATD; 277/92, 94, 95, 235

[56] References Cited
UNITED STATES PATENTS

| | | | |
|---|---|---|---|
| 3,073,657 | 1/1963 | Oxford ........................... | 277/92X |
| 3,167,321 | 1/1965 | Land et al. ..................... | 277/92 |
| 3,180,648 | 4/1965 | Kupfert et al. ................. | 277/92 |
| 3,392,984 | 7/1968 | Reinsma et al. ................ | 305/11 |

Primary Examiner—Laverne D. Geiger
Assistant Examiner—Jeffrey S. Mednick
Attorney—Fryer, Tjensvold, Feix, Phillips & Lempio ABSTRACT: An inverted seal ring assembly disposed between concentrically spaced apart, relatively rotatable members. Load rings, disposed between seal rings and concentric retaining rings to provide loading, act upon inclined inside ramps of the seal rings and inclined ramps on the outside diameters of the retaining rings. Additional O-rings seal the junctures between the retaining ring inserts and the relatively rotatable members.

Patented Nov. 17, 1970 3,540,743
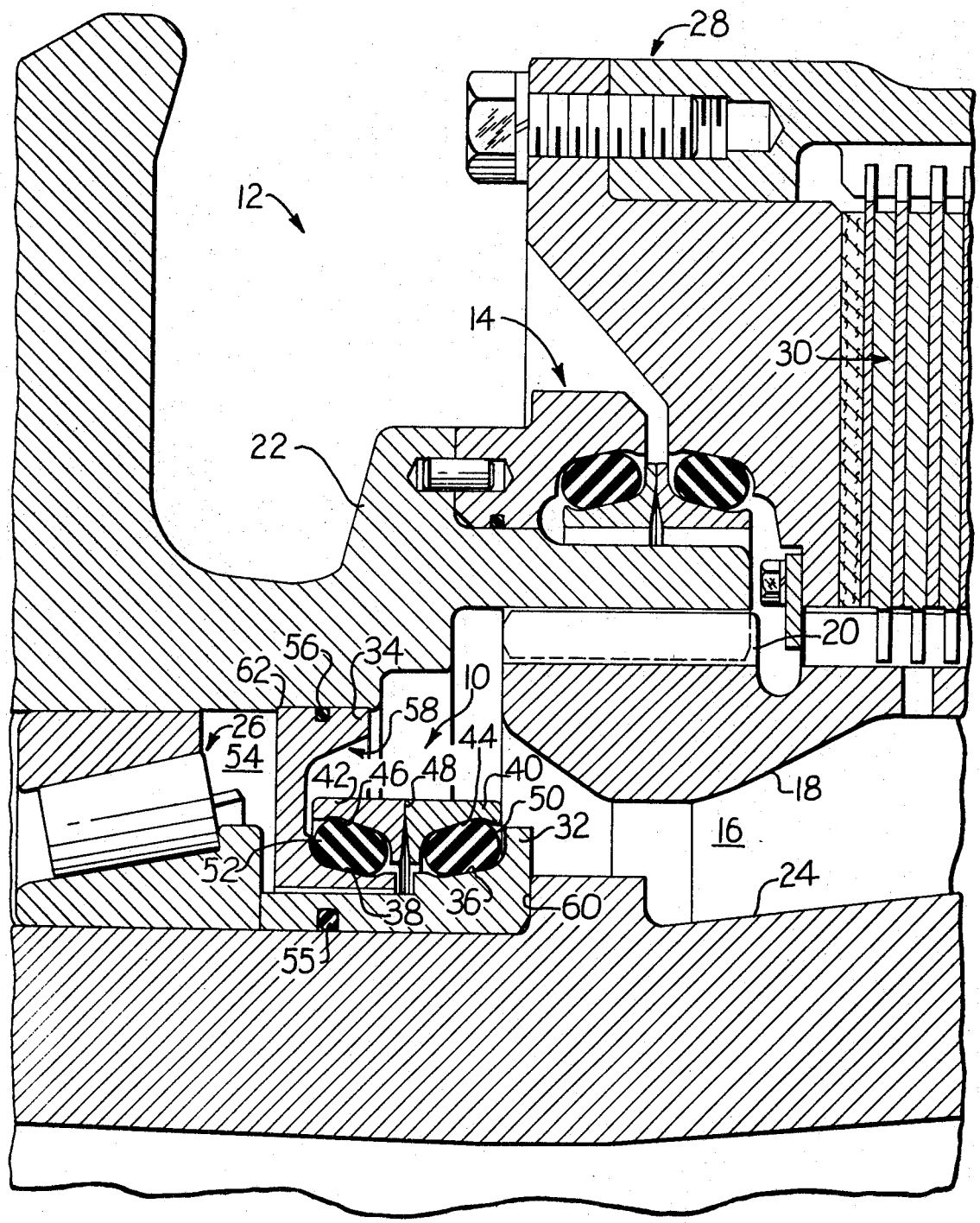
INVENTORS
EDWIN J. ASHTON
BERNARD F. KUPFERT
BY
Fryer, Tjensvold, Feix, Phillips & Lempio
ATTORNEYS 3,540,743

INVERTED FLOATING RING SEAL

BACKGROUND OF THE INVENTION

Numerous seal ring configurations are available to provide rotatable seals between stationary and rotating members in environments such as track-type vehicles, big hole cutters, etc. Typical rotatable seal configurations are described in U.S. Pat. No. 3,180,648 issued to Kupfert, et al. and U.S. Pat. No. 3,392,984, issued to Reinsma, et al., both assigned to the assignee of the present application. Such configurations generally employ dual cones and seal rings with axial loading imparted to the seal rings by means of resilient load rings. Tapered surfaces formed along the outside diameter of the seal rings receive the load rings. Axial loading of the seal rings generally exerts a radially inward force upon the inclined ramp surfaces of the seal rings. Such configurations are normally employed to seal fluids on the inside of the seal rings.

In various applications, it is desirable to provide a rotatable seal configuration where fluid is to be sealed along the outside diameter of the seal rings. Prior art seals generally utilize complex cone members, requiring extensive design and machining, to maintain similar forces upon the load rings and achieve proper sealing.

SUMMARY OF THE INVENTION

The present invention provides an inverted seal ring with its inclined surfaces or cones on their inside diameters. The load ring which provides the axial loading is also disposed within the inside diameters of the seal rings.

It is accordingly a principal object of the present invention to provide a simple and reliable inverted floating seal assembly.

It is a still further object to provide a simple and reliable seal configuration particularly adapted for use with a conventional seal ring configuration to provide an oil pocket therebetween which may be used to confine the fluid therein from other fluids and/or foreign matter.

It is another object to provide simple retaining rings permitting rapid and inexpensive disposition of a floating seal assembly between concentrically spaced apart, relatively rotatable members.

Other objects and advantages of the present invention will be made apparent from the following description having reference to the accompanying drawing.

BRIEF DESCRIPTION OF THE DRAWING

The single FIG. of the drawing is a cross-sectional view of the present inverted seal ring assembly utilized in conjunction with a conventional seal ring assembly in an oil cooled brake assembly of an off-highway truck wheel.

DESCRIPTION OF THE PREFERRED EMBODIMENT

Referring to the drawing, an inverted seal ring assembly 10 of the invention is installed in a wheel assembly 12. A conventional seal ring assembly is also shown at 14. Cooling oil for cooling the brake discs of the wheel is circulated in the chamber 16, and seal assemblies 10 and 14 seal one end of the chamber 16. The seal assembly 10 also keeps the cooling oil in the chamber 16 separated from the lubricating oil for a wheel bearing 26.

Briefly, the wheel assembly 12 includes a hub member 18, which is secured by means of a spline configuration 20 to a rotatable wheel, a portion of which is shown at 22. A spindle 24 which extends in concentric spaced-apart relation through the wheel 22 and hub member 18 is supported for rotation by bearing means 26. A nonrotatable brake housing 28 is concentrically disposed about the hub member 18 and fixed to the spindle 24 by suitable means (not shown). A disc brake assembly 30 is disposed between the hub member 18 and the brake housing 28 for applying braking action between the stationary spindle 24 and the rotatable wheel 22.

The conventional rotatable seal ring assembly 14 is concentrically disposed between the wheel member 22 and the brake housing 28 to provide a seal therebetween while partially defining the oil pocket 16 within which is circulated a seal and brake cooling fluid.

The inverted seal ring assembly 10 of the invention is disposed between the wheel member 22 and the spindle 24 adjacent the bearing 26. The seal assembly 10 comprises a rotatable retaining ring 32 concentrically secured to the spindle 24 and a stationary retaining ring 34 concentrically secured within the wheel member 22. Inclined surfaces 36 and 38 are formed in the retaining rings 32 and 34, respectively, with the surfaces 36 and 38 both facing radially outwardly. Seal rings 40 and 42 are disposed circumjacently about the retaining rings 32 and 34, respectively, and have radially inwardly facing inclined surfaces 44 and 46 disposed in general confronting relation to the inclined surfaces 36 and 38, respectively. A rotatable seal surface 48 is provided between confronting faces of the seal rings 40 and 42. The inclined surfaces 44 and 46 progressively increase the inside diameter of said ring from said seal surface. Resilient load rings 50 and 52 are provided between the pairs of confronting inclined surfaces 36, 44 and 38, 46, respectively, to provide for axial loading of the seal rings 40 and 42.

In accordance with the invention, the load rings 50 and 52 are disposed along the inside diameters of the seal rings 40 and 42 so that they are in compression rather than in tension as, for example, in the conventional seal ring assembly 14. Thus, the load rings tend to exert outwardly and axially acting forces on the seal rings to effect the rotatable seal therebetween. Further, the inclined surfaces 44 and 46 of the floating seal assembly are formed on the inside of the rings, not the outside as in the prior art.

The cooling fluid pocket 16 is accordingly sealed from not only the outside atmosphere and foreign matter, but is also isolated via the inverted seal ring assembly 10 from a lubricating fluid pocket 54 in the region of the bearings 26. The rotatable seal surface 48 is preferably provided along the outermost radial portion of the seal rings 40 and 42, whereby the outwardly exerted action of the load rings tends to force the confronting seal surface together to define an optimum rotatable seal.

The retaining rings 32 and 34 provide compact and inexpensive means for rapidly and inexpensively disposing the seal assembly 10 between the concentrically spaced apart relatively rotatable members 22 and 24. One of the retaining rings, for example that one indicated at 34, is separately formed for insertion between the concentrically spaced-apart members to permit assembly or disassembly of the wheel and seal assembly. The other retaining ring 32 is also separately formed so that inclined surfaces 36 and 38 for receiving the load rings 50 and 52 need not be formed on the cumbersome members of the wheel assembly. A sealed relation of the retaining rings 32 and 34 with members 24 and 22, respectively, is maintained by O-rings 55 and 56.

To provide a compact seal assembly requiring minimum axial space, the retaining ring 34 is channeled at 58 with its inclined surface 38 being formed within the channel. Thus, the associated seal ring 42 is cupped and resiliently supported, by means of the load ring 52, substantially within the channeled retaining ring 34.

Axial motion of the retaining rings 32 and 34 is respectively resisted by shoulder means 60 and 62 on the members 24 and 22. Axial forces exerted between the retaining rings by the load rings and seal rings of the floating seal assembly urge the retaining rings against their respective shoulders to maintain the entire seal assembly in place.

We claim:

1. An inverted floating seal assembly for providing a rotatable seal between two relatively rotatable members, comprising:

a pair of annular seal rings each having formed therein a radially inwardly facing inclined surface and an annular seal surface, the seal rings being arranged with their seal surfaces adjacent each other, said inclined surface increasing the inside diameter of said ring progressively from said seal surface; and a pair of concentric retaining members each associated for rotation with one of the respective members and having a radially outwardly facing inclined surface formed thereon, the retaining members being disposed with their inclined surfaces in generally confronting and converging relation with the respective inclined surfaces of the seal rings, and a resilient load ring disposed between each pair of confronting inclined surfaces, said load rings providing a radially outwardly and axially acting force on each annular seal ring to urge their annular seal surfaces into rotatably sealing relation.

2. The seal assembly of claim 1 wherein the seal surfaces and thus the rotatable seals are formed along the radially outermost portion of the annular seal rings.

3. The seal assembly of claim 1 wherein the relatively rotatable members are disposed in concentrically spaced-apart relation, the seal assembly providing a rotatable seal in the concentric space, and one of the retaining rings is inserted generally between the annularly spaced-apart members and has an O-ring to provide a seal between the one retaining ring and the rotatable member with which it is associated.

4. The seal assembly of claim 3 wherein the one retaining ring is annularly channeled and its inclined surface is formed within the channel to receive the associated seal ring and load means disposed therebetween substantially within the channel of the one retaining ring.

5. The seal assembly of claim 4 wherein the other retaining ring is also inserted generally between the concentrically spaced-apart members and has an O-ring to provide a seal between the other retaining ring and the member with which it is associated.

6. The invention of claim 1 wherein the two members are a spindle and another member of a wheel assembly, the other member being concentrically spaced from the spindle, the seal assembly being disposed substantially in the concentric space between the spindle and other member.

7. A compact seal ring assembly providing a rotatable seal between two concentrically spaced-apart relatively rotatable members, the seal ring assembly being associated with one of the rotatable members and providing a rotatable seal in relation with a sealing surface associated with the other rotatable member, the combination comprising:

an annular seal ring having formed therein a radially inwardly facing inclined surface and a radially arranged seal surface, said inclined surface increasing the inside diameter of said ring progressively from said seal surface;

a resilient load ring acting upon said radially inclined surface of said seal ring; and an annularly channeled ring retainer having a radially outwardly facing inclined surface formed within its channel for receiving said resilient load means, said retainer being arranged with its inclined surface in confronting and converging relation with the inclined surface of said seal ring to cup and resiliently support and load said seal ring within its channel and maintain the seal surface of the seal ring in sealing engagement with the seal surface of the other rotatable member.

8. The compact seal ring assembly of claim 7 wherein:

the annular seal ring is an insert to be maintained in sealed relation with the one rotatable member by means of a resilient O-ring; and the sealing surface associated with the other rotatable member is provided by another annular seal ring with a resilient load ring disposed between generally confronting radially inclined surfaces formed on the other annular seal ring and another ring retainer associated in sealed relation with the other rotatable member.